(12) United States Patent
Thomas

(10) Patent No.: US 6,206,785 B1
(45) Date of Patent: Mar. 27, 2001

(54) CONSTANT VELOCITY UNIVERSAL JOINT AND METHOD

(75) Inventor: Steven Mark Thomas, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/264,143

(22) Filed: Mar. 5, 1999

(51) Int. Cl.[7] ........................................ F16D 3/16
(52) U.S. Cl. .................. 464/145; 464/141; 464/142; 403/141
(58) Field of Search .................... 464/145, 142, 464/141, 906; 403/128, 127, 141, 142, 143

(56) References Cited

U.S. PATENT DOCUMENTS

| 2,319,100 | * | 5/1943 | Anderson | 464/144 |
| 2,322,570 | * | 6/1943 | Dodge | 464/144 |
| 3,447,341 | * | 6/1969 | Miller | 464/144 |
| 4,846,764 | * | 7/1989 | Hazebrook et al. | 464/145 |
| 5,221,233 | * | 6/1993 | Jacob | 464/145 |

* cited by examiner

Primary Examiner—B. Dayoan
Assistant Examiner—Aaron Dunwoody
(74) Attorney, Agent, or Firm—Edmund P. Anderson

(57) ABSTRACT

A non-stroking constant velocity universal joint including an inner joint member, an outer joint member, and a plurality of torque transferring bearing spheres in facing pairs of ball grooves in the inner and outer joint members. The bearing spheres are maintained in a common plane bisecting the angle of articulation between the inner and outer joint members by a cage consisting of a pair of hollow hemi-spherical segments ("hemi-segments") clamped radially against each other by the outer joint member. Interlocking lugs and notches on the hemi-segments prevent relative linear translation therebetween. The hemi-segments are made from flat blanks which are perforated for the cage windows and then plastically deformed to the shape of the hemi-segments. The cage is assembled around the inner joint member and may, therefore, have dimensions which reduce unit stresses in the cage and preclude assembly of the inner joint member into the cage through a circular open end of the cage.

5 Claims, 4 Drawing Sheets

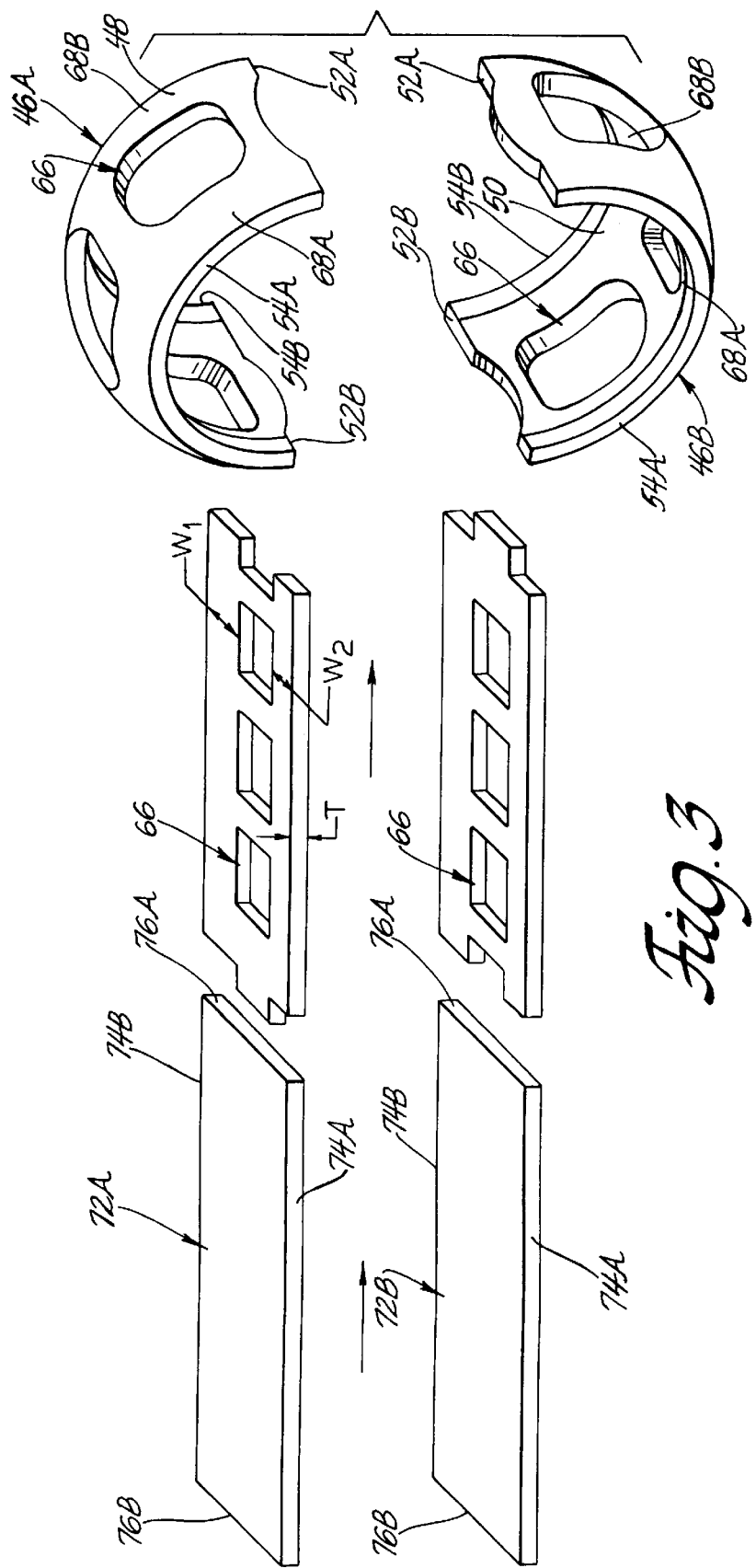

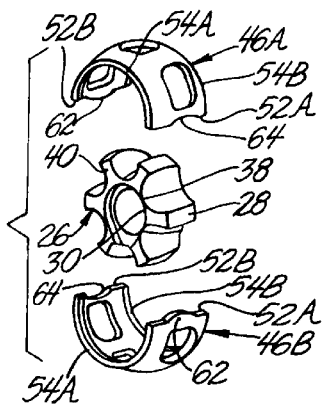
Fig.4A
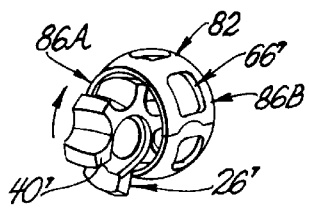
Fig.5A
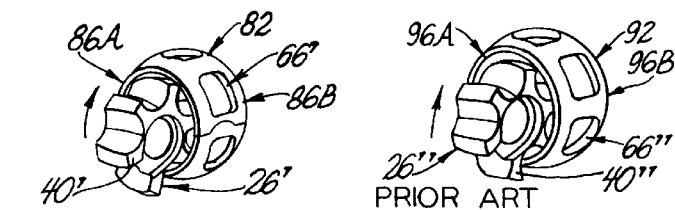
Fig.6A — PRIOR ART
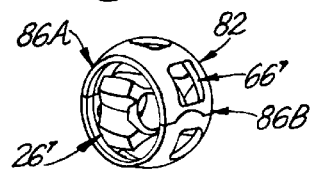
Fig.5B
Fig.6B — PRIOR ART
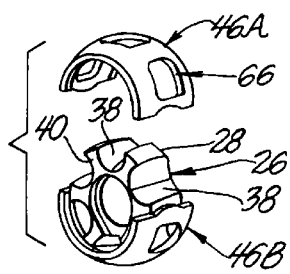
Fig.4B
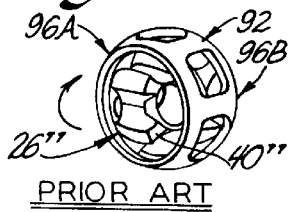
Fig.5C
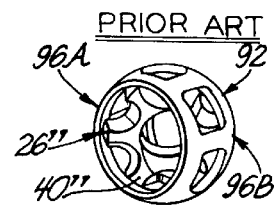
Fig.6C — PRIOR ART
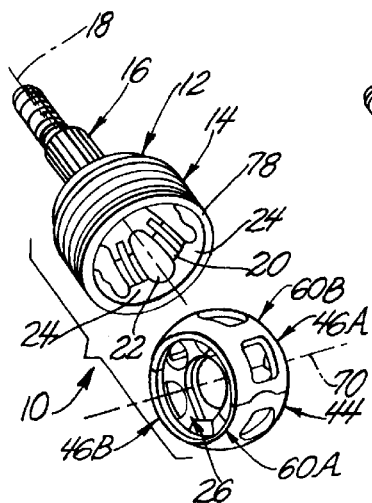
Fig.4C
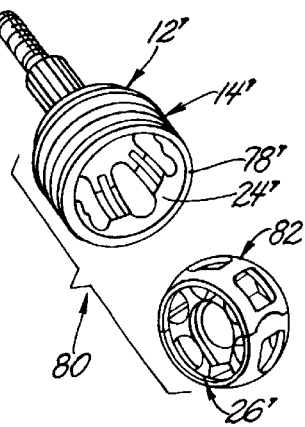
Fig.5D
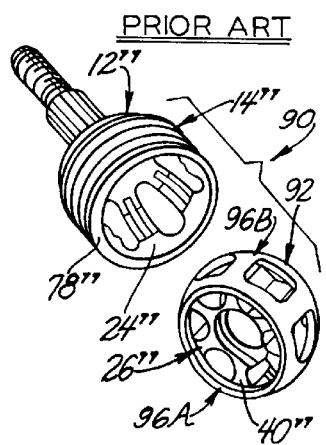
Fig.6D — PRIOR ART

CONSTANT VELOCITY UNIVERSAL JOINT AND METHOD

TECHNICAL FIELD

This invention relates to a constant velocity universal joint ("cv joint").

BACKGROUND OF THE INVENTION

A non-stroking cv joint commonly identified as a "Rzeppa Joint" includes an inner joint member, an outer joint member around the inner joint member, and a plurality of torque transferring bearing spheres in facing pairs of ball grooves in the inner and outer joint members which roll in the ball grooves during relative universal articulation between the inner and outer joint members. The bearing spheres are maintained in a common plane bisecting the angle of articulation between the inner and outer joint members by a hollow spherical cage ("cage") made from a unitary tubular blank. The cage has a plurality of windows for the bearing spheres and a pair of opposite circular open ends. The inner joint member is assembled in the cage by being rolled endwise through one of the circular open ends thereof while a partition on the inner joint member between a pair of its ball grooves meshes with one of the cage windows to reduce the cross-sectional profile of the inner joint member to less than the diameter of the circular open end of the cage. The structural integrity of the cage may be improved by reducing the unit stresses therein such as by increasing the wall thickness of the tubular blank and by reducing the areas of the cage windows. Such measures, however, are limited by the requirement that the inner joint member must roll endwise through the circular open ends of the cage for assembly therein. A non-stroking cv joint according to this invention has improved structural integrity relative to comparably sized prior non-stroking cv joints and is, therefore, an improvement over such prior non-stroking cv joints.

SUMMARY OF THE INVENTION

This invention is a new and improved non-stroking cv joint commonly identified as a "Rzeppa Joint" including an inner joint member, an outer joint member around the inner joint member, and a plurality of torque transferring bearing spheres in facing pairs of ball grooves in the inner and outer joint members which roll in the ball grooves during relative universal articulation between the inner and outer joint members. The bearing spheres are maintained in a common plane bisecting the angle of articulation between the inner and outer joint members by a cage consisting of a pair of hollow hemispherical segments ("hemi-segments") clamped radially against each other by the outer joint member. Interlocking lugs and notches on the hemi-segments prevent relative linear translation therebetween. The hemi-segments are made from flat blanks which are perforated for the cage windows and then plastically deformed to the shape of the hemi-segments. The cage is assembled around the inner joint member and may, therefore, have dimensions which reduce unit stresses in the cage and preclude assembly of the inner joint member into the cage through a circular open end of the cage.

BRIEF DESCRIPTION OF THE DRAWINGS

FIG. 3 is a schematic representation of steps in a method of making the cages of the cv joint and the modified cv joint according to this invention;

FIGS. 4A–4C are perspective views illustrating further steps in the method of making the cv joint according to this invention;

FIGS. 5A–5D are perspective views illustrating further steps in the method of making the modified cv joint according to this invention;

FIGS. 6A–6D are perspective views illustrating steps in the method of making the prior art cv joint.

DESCRIPTION OF THE PREFERRED EMBODIMENT

Figure 1:
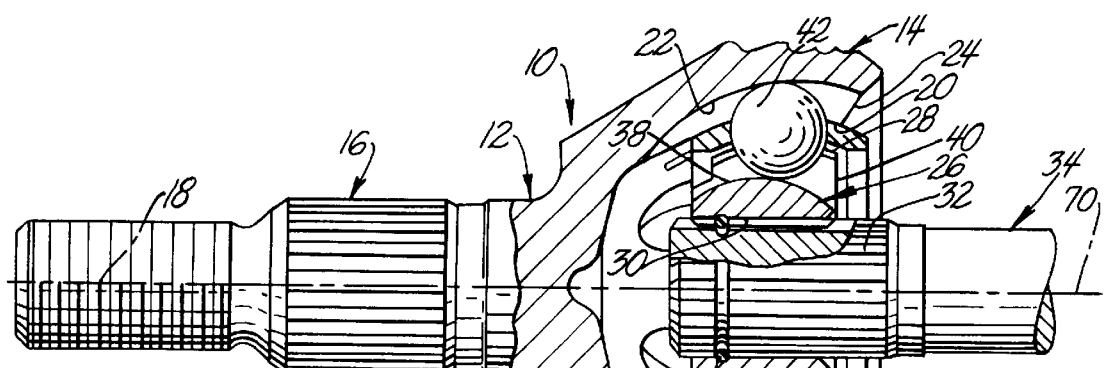
FIG. 1 is a longitudinal sectional view of a non-strokilng cv joint according to this invention.

Referring to FIGS. 1, 2A and 4A–4C, a Rzeppa Joint type cv joint 10 according to this invention includes an outer joint member 12 having cup 14 and an integral stem 16. The outer joint member 12 is supported at the stem 16 on another structural element, e.g. a motor vehicle steering knuckle, for rotation about an axis of rotation 18 of the outer joint member. A spherical wall 20 of the cup 14 is interrupted by a plurality of outer ball grooves 22 separated by a plurality of inward facing tooth-like partitions 24.

An inner joint member 26 of the cv joint 10 inside of the outer joint member 12 has a spherical wall 28 facing the spherical wall 20 of the cup 14 and a bore 30. A plurality of longitudinal splines in the bore 30 mesh with a corresponding plurality of longitudinal splines on an end 32 of a shaft 34, e.g. a front axle shaft of a motor vehicle, whereby the inner joint member 26 and the shaft 34 are rigidly coupled together. A retaining ring 36 prevents dislodgment of the shaft from the inner joint member. The spherical wall 28 of the inner joint member is interrupted by a plurality of outward facing inner ball grooves 38 separated by a corresponding plurality of outward facing tooth-like partitions 40.

The inner and outer ball grooves 38,22 are arrayed in facing pairs with respective ones of a plurality of bearing spheres 42 disposed therebetween. The bearing spheres 42 cooperate with the ball grooves 38,22 in transferring torque between the inner and outer joint members 26,12 and in supporting the inner and outer joint members on each other for relative universal articulation.

Figure 2A:
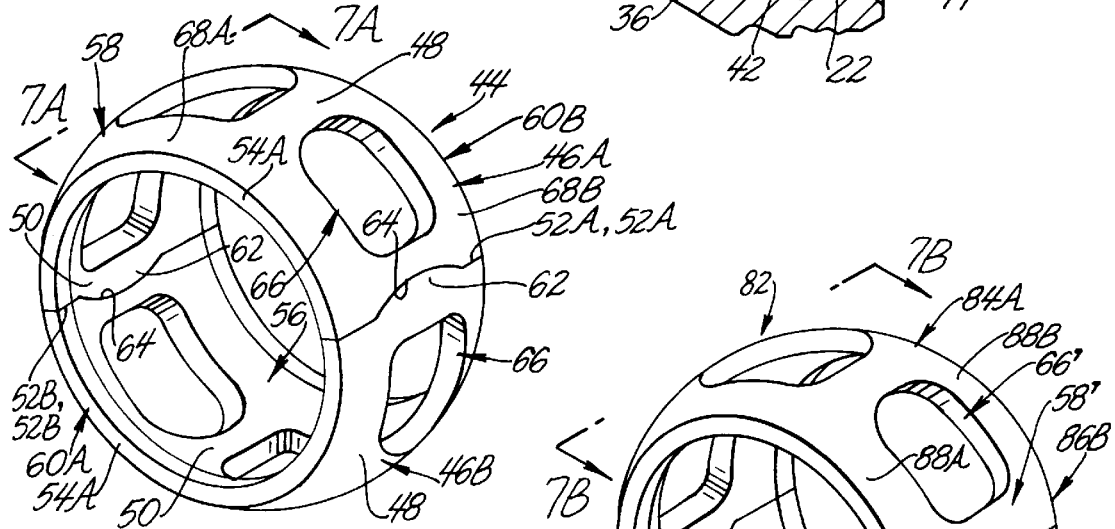
FIGS. 2A–2C are perspective views of cages of, respectively, the cv joint according to this invention, a modified cv joint according to this invention, and a prior art cv joint.

A cage 44, FIGS. 1, 2A and 4C, of the cv joint 10 consists of a pair of hollow hemispherical segments ("hemi-segments") 46A,46B. Each of the hemi-segments 46A,46B includes a spherical outer surface 48, a spherical inner surface 50, a pair of planar end walls 52A,52B, FIG. 4A. and a pair of semi-circular edges 54A,54B, FIG. 4A. When the planar end walls 52A,52A and 52B,52B are seated against each other, FIG. 2A, the spherical inner and outer surfaces 50,48 of the hemi-segments cooperate in defining an uninterrupted spherical inner surface 56 and an uninterrupted spherical outer surface 58 of the cage 44. At the same time, the semi-circular edges 54A,54A and 54B,54B of the hemi-segments surround respective ones of a pair of circular open ends 60A,60B of the cage 44.

The spherical wall 20 of the cup 14 of the outer joint member surrounds the uninterrupted spherical outer surface 58 of the cage 44 and clamps the hemi-segments 46A,46B together at the planar end walls 52A,52A and 52B,52B thereof. The spherical wall 20 of the cup also cooperates with the uninterrupted spherical outer surface 58 of the cage in capturing the cage in the cup and in supporting the cage on the outer joint member for relative universal articulation. The spherical wall 28 of the inner joint member 26 is captured in the uninterrupted spherical inner surface 56 of the cage and supports the cage on the inner joint member for relative universal articulation. A pair of lugs 62 on the end walls of the hemi-segments 46A,46B cooperate with respective ones of a pair of correspondingly shaped notches 64 in constituting a locking means between the hemi-segments which prevents relative linear translation between the end walls 52A,52A and 52B,52B. An alternative locking means, not shown, is constituted by tack welds between the end walls 52A,52A and 52B,52B.

The cage 44 is perforated by a plurality of generally rectangular windows 66 for respective ones of the bearing spheres 42. The windows 66 are separated from the circular open ends 60A,60B of the cage 44 by respective ones of a pair of equal hoop portions 68A,68B, FIGS. 2A and 7A, of the cage. Each window 66 has a pair of long sides in planes parallel to the circular open ends of the cage 44 and a pair of short sides perpendicular to the long sides. The long sides of the windows 66 are separated by a span corresponding closely to the diameters of the bearing spheres 42. The short sides of the windows 66 are separated by a span substantially exceeding the diameters of the bearing spheres. The long sides of the windows confine the bearing spheres in a common plane which bisects the angle of articulation between the axis of rotation 18 of the outer joint member and an axis of rotation 70 of the inner joint member which coincides with a longitudinal centerline of the shaft 34. When the axes of rotation 18,70 are articulated, the bearing spheres oscillate back and forth in the windows 66 between the short sides thereof during rotation of the cv joint 10.

Referring to FIG. 3, the hemi-segments 46A,46B are made from a pair of flat metal blanks 72A,72B each including a pair of longitudinal edges 74A,74B and a pair of lateral edges 76A,76B. The blanks may be formed in any conventional manner e.g. by being, severed from the end of a coiled metal ribbon. Each blank 72A,72B is perforated to form therein the windows 66 and contoured at the lateral edges 76A,76B to define the lugs 62 and the notches 64. Each of the flat blanks 72A,72B is characterized by a wall thickness dimension "T" and a pair of equal hoop width dimensions $W_1$, $W_2$ on opposite sides of the windows. After the flat blanks are perforated and contoured, each is plastically deformed by a stamping or other conventional metal forming apparatus not shown, into the shape of the hemi-segments 46A,46B with respective ones the longitudinal edges 74A,74B defining the semi-circular edges 54A,54B and the lateral edges 76A,76B defining the end walls 52A, 52B of the hemi-segments.

In addition to the steps of forming the inner and outer joint members 26,12, forming the bearing spheres 42, and forming the cage 44 as described above, the method of making the cv joint 10 according to this invention further includes the following assembly steps. The hemi-segments 46A,46B are separated radially, FIG. 4A, far enough the for the inner joint member 26 to be inserted therebetween. The inner joint member is then seated in the hemi-segment 46B parallel to the plane of the semi-circular edge 54A thereof, FIG. 4B. The inner joint member is then captured in the cage 44 by closing the other hemi-segment 46A over the inner joint member until the end walls 52A,52A and 52B,52B of the hemi-segments bear against each other with the lugs 62 seated in the notches 64, FIG. 4C. Alternatively, the end walls 52A,52A and 52B,52B may be tack welded together after the hemi-segment 46A is closed over the inner joint member.

The cage 44, with the inner joint member therein, is then turned endwise in front of an open side 78 of the cup 14 of the outer joint member, FIG. 4C, and translated into the cup with diametrically opposite ones of the windows 66 in the cage fitting between diametrically opposite ones of the tooth-like partitions 24 on the cup. Once inside of the cup, the cage is rotated flush with the open side 78 thereof whereby the cage is captured in and supported on the outer joint member for relative universal articulation.

The bearing spheres 42 are installed in conventional fashion by articulating each of the cage 44 and the inner joint member 26 beyond a normal angle of articulation relative to the outer joint member until the windows 66 and the inner ball grooves 38 are exposed enough to receive the bearing spheres. When the angles of articulation of the cage and of the inner joint member are returned to within their normal ranges relative to the outer joint member, the bearing spheres are captured in the windows and between the respective facing pairs of inner and outer ball grooves. When the inner joint member is articulated back to within its normal articulation range relative to the outer joint member, the bore 30 in the inner joint member is exposed for insertion of the end 32 of the shaft 34. Thereafter, the shaft cooperates with the cup 14 in limiting universal articulation of the inner joint member and the cage beyond their normal articulation ranges so that the bearing spheres cannot escape from between the inner and outer joint members.

A modified cv joint 80 according to this invention is illustrated in FIGS. 2B and 5A–5D. In FIGS. 5A–5D, structural elements common to the cv joint 10 and to the modified cv joint 80 are identified by primed reference characters. The modified cv joint 80 includes an outer joint member 12', an inner joint member 26' and a cage 82. The cage 82 consists of a pair of hemi-segments 84A,84B each including a spherical outer surface, a spherical inner surface, a pair of planar end walls, and a pair of semi-circular edges.

When the planar end walls of the hemi-segments 84A, 84B are seated against each other, the spherical inner and outer surfaces thereof cooperate in defining an uninterrupted spherical inner surface 56' and an uninterrupted spherical outer surface 58' on the cage 82. At the same time, the semi-circular edges of the hemi-segments 84A,84B surround respective ones of a pair of circular open ends 86A,86B of the cage 82. A pair of lugs on respective ones of end walls of the hemi-segments 84A,84B cooperate with respective ones of a pair of correspondingly shaped notches in the end walls of the hemi-segments in preventing relative linear translation between the end walls. Alternatively, the end walls may be tack welded together for retention.

The cage 82 is perforated by a plurality of generally rectangular windows 66' for respective ones of a plurality of bearing spheres, not shown. The windows 66' are separated from the circular open ends 86A,86B of the cage by respective ones of a pair of unequal hoop portions 88A,88B of the cage. The windows 66' confine the bearing spheres in a common plane which bisects the angle of articulation between the axes of rotation of the inner and the outer joint members. The bearing spheres oscillate back and forth in the windows 66' between the short sides thereof during rotation of the cv joint 80 with the axes of rotation of the inner and outer joint members articulated.

Referring to FIG. 3, the hemi-segments 84A,84B are made from the flat metal blanks 72A,72B. Each blank, however, is perforated asymmetrically relative to the longitudinal edges 74A,74B thereof so that the hoop width dimension $W_1$ defining the width of the hoop portion 88B on one side of the windows 66' exceeds the hoop width dimension $W_2$ defining the hoop portion 88A on the other side of the windows 66'. The perforated flat blanks 72A,72B are then plastically deformed by a stamping or other conventional metal forming apparatus, not shown, into the shape of the hemi-segments 84A,84B.

Figure 2B:
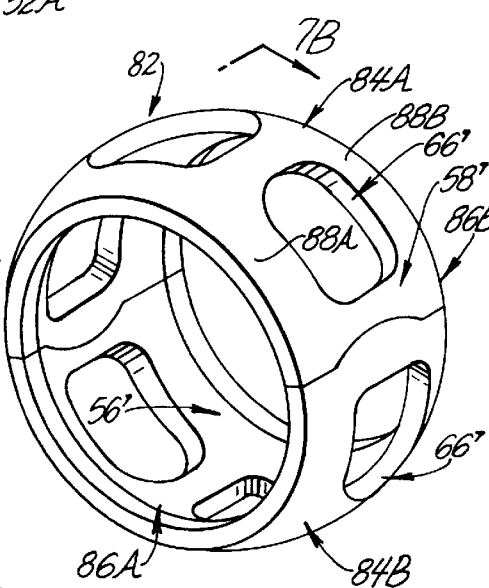
Figure 2C:
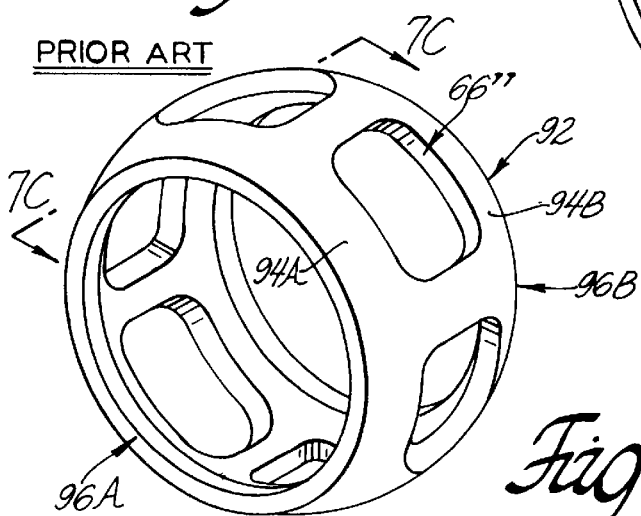

To assemble the modified cv joint 80, the cage 82 is formed by closing the hemi-segments 84A,84B together at the ends walls thereof with the lugs seated in the notches, FIG. 2B. The inner joint member 26' is then turned endwise in front of the circular open end 86A of the cage, FIG. 5A, which is larger than the circular open end 86B because of the shorter hoop width dimension $W_2$ and rolled into the cage, FIG. 5B, through the open circular end 86A. At the same time, one of a plurality of tooth-like partitions 40', FIG. 5A, on the inner joint member meshes with one of the windows 66' in the cage 82 to reduce the cross sectional profile of the inner joint member to less than the diameter of the circular open end 86A of the cage. The inner joint member is then captured in the cage by being rotated flush with the circular open ends 86A,86B of the cage, FIG. 5C.

The cage 82, with the inner joint member therein, is then turned endwise in front of an open side 78' of a cup 14' of the outer joint member 12', FIG. 5D, and translated into the cup with diametrically opposite ones of the windows 66' in the cage fitting between diametrically opposite ones of a plurality of tooth-like partitions 24' on the outer joint member. Once inside of the cup, the cage is rotated flush with the open side 78' thereof whereby the cage is captured in and supported on the outer joint member for relative universal articulation. The bearing spheres and a shaft, not shown, are then assembled as described above.

A prior art cv joint 90 is illustrated in FIGS. 2C and 6A–6D. In FIGS. 6A–6D, structural elements common to the cv joints 10 and 80 according to this invention and the prior art cv joint 90 are identified by double primed reference characters. The prior art cv joint 90 includes an outer joint member 12", an inner joint member 26" and a cage 92. The cage 92 is made from a unitary tubular blank, not shown, and includes a plurality of windows 66" for respective ones of a plurality of bearing spheres, not shown, and a pair of equal hoop portions 94A,94 between the windows and respective ones of a pair of circular open ends 96A,96B of the cage, FIG. 2C.

To assemble the prior art cv joint 90, the inner joint member 26" is turned endwise in front of one of the circular open ends 96A,96B of the cage 92, FIG. 6A, and rolled into the cage, FIG. 6B, through that open circular end. At the same time, one of a plurality of tooth-like partitions 40", FIG. 6A, on the inner joint member meshes with one of the windows 66" in the cage to reduce the cross sectional profile of the inner joint member to less than the diameter of the circular open end of the cage. The inner joint member is then captured in the cage 92 by being rotated flush with the circular open ends of the cage, FIG. 6C.

The cage 92, with the inner joint member therein, is then turned endwise in front of an open side 78" of a cup 14" of the outer joint member 12", FIG. 6D, and translated into the cup with diametrically opposite ones of the windows 66" in the cage fitting between diametrically opposite ones of a plurality of tooth-like partitions 24" on the outer joint member. Once inside of the cup, the cage 92 is rotated flush with the open side 78" thereof whereby the cage is captured in and supported on the outer joint member for relative universal articulation. Bearing spheres, not shown, and a shaft not shown, are then assembled as described above.

Figure 7A:
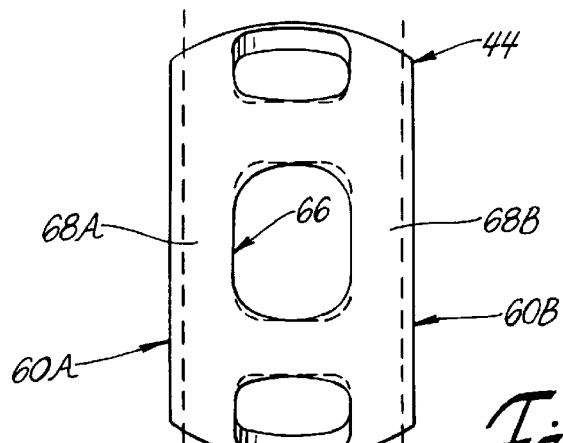
FIGS. 7A–7C are views taken generally along the planes indicated, respectively, by lines 7A—7A, 7B—7B, and 7C—7C in FIGS. 2A, 2B, and 2C.

In comparison to the prior art cv joint 90, the equivalently sized cv joint 10 according to this invention exhibits improved structural integrity. That is, the hoop portions 68A,68B of the cage 44, FIG. 7A, are wider than the hoop portions 94A,94B of the cage 92, FIG. 7C, the windows 66 of the cage 44 are smaller than the windows 66" of the cage 92 as indicated by the broken line window outlines in FIG. 7A, and the wall thickness dimension "T" of the cage 44 may exceed the wall thickness dimension of the cage 92. The unit stresses in the cage 44 are, therefore, lower than in the cage 92 so that the structural integrity of the cage 44, and therefore of the cv joint 10, is improved relative to the structural integrity of the prior art cv joint 90. The hoop portions 68A,68B, the windows 66, and the wall thickness dimension "T" of the cage 44 cannot be duplicated in the cage 92 of the prior art cv joint because to do so would prohibitively reduce the diameters of the circular open ends 96A,96B of the cage 92 and/or induce interference between the windows 66" of the cage and the tooth-like partitions 40" on the inner joint member 26", thereby blocking assembly of the inner joint member into the cage.

Figure 7B:
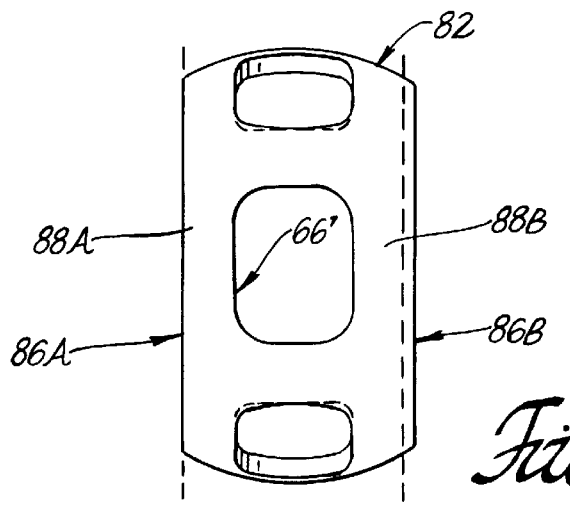
Figure 7C:
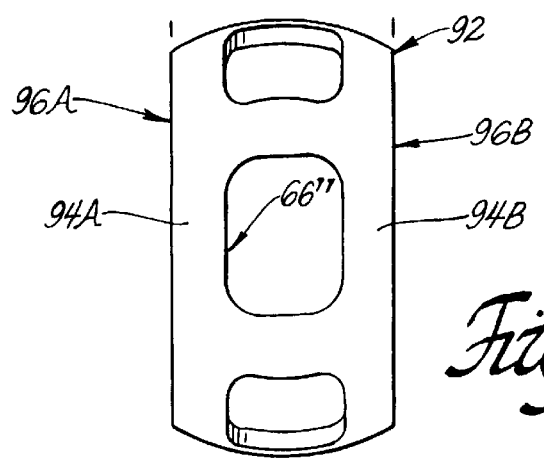

In comparison to the prior art cv joint 90, the equivalently sized modified cv joint 80 according to this invention also exhibits improved structural integrity. The hoop portion 88B of the cage 82, FIG. 7B, is wider than the corresponding hoop portion 94B of the cage 92, FIG. 7C, of the prior art cv joint. Also, the wall thickness "T" of the cage 82 may exceed the wall thickness of the cage 92 of the prior art cv joint. However, to preserve the same assembly steps as the prior art cv joint, the other hoop portion 88A of the cage 82 has the same width as the corresponding hoop portion 94A of the cage 92 of the prior art cv joint. The result is that the unit stresses in the cage 82 are lower than in the cage 92, but not as low as the unit stresses in the cage 44 of the cv joint 10, and that the inner joint member 26' of the modified cv joint 80 can still be assembled into the cage 82 by being rolled through the open circular end 86A as illustrated in FIGS. 5A–5D. In other words, the open circular end 86A of FIG. 7B is large enough to accommodate roll-in installation of the inner joint member 26 into the cage 82 through the open circular end 86A by reason of the narrower hoop portion 88A, whereas the relatively wide hoop portions 68A, 68B of the cage 44 of FIG. 7A present the open circular ends 60A, 60B which are each too small (like that of end 86B of FIG. 7B as can be seen by a comparison of the Figures, noting the broken chain lines as reference) to accommodate the installation of the inner joint member 26 into the cage 44 through either open ends 60A, 60B. Consequently, the cage 44 of FIG. 7A must be split as shown in FIGS. 4A and 4B to enable installation of the inner joint member 26 into the cage 44.

What is claimed is:

1. A constant velocity universal joint, comprising:
    an outer joint member having an inner surface formed with a plurality of curved outer ball grooves;
    an inner joint member disposed in said outer joint member having an outer surface formed with a plurality of curved inner ball grooves aligned with said outer ball grooves of said outer joint member to define a plurality of facing pairs of said inner and outer ball grooves;
    a plurality of torque-transmitting balls disposed in said facing pairs of said inner and outer ball grooves; and
    a cage disposed between said inner and outer joint members having a circumferentially extending outer surface and a circumferentially extending inner surface, a plurality of windows capturing said balls, a pair of opposite open ends each dimensioned relative to said inner joint member to preclude installation of said inner joint member into said cage through either one of said open ends of said cage, and wherein said cage is separable into half segments which are operative when separated to accommodate the installation of said inner joint member between said separated half segments and operative when joined to capture and retain said inner joint member within said cage.

2. The joint of claim 1 wherein each half segment has end walls which abut corresponding end walls of the respective outer half segment when said half segments are joined.

3. The joint of claim 2 wherein said end walls extend axially of said cage.

4. The joint of claim 2 wherein said end walls have features which interlock when said half segments are joined to preclude relative axial movement between said half segments.

5. The joint of claim 1 wherein said half segments each have a semi-circular configuration.

* * * * *